United States Patent
Meisen et al.

(10) Patent No.: US 7,144,455 B2
(45) Date of Patent: Dec. 5, 2006

(54) PROCESS FOR PREPARING YELLOW IRON OXIDE PIGMENTS WITH CACO$_3$ PRECIPITANT

(75) Inventors: Ulrich Meisen, Kall (DE); Horst Brunn, Meerbusch (DE); Karl-Heinz Van Bonn, Alpen (DE); Holger Friedrich, Krefeld (DE)

(73) Assignee: Bayer Chemicals AG, Leverkusen (DE)

( * ) Notice: Subject to any disclaimer, the term of this patent is extended or adjusted under 35 U.S.C. 154(b) by 314 days.

(21) Appl. No.: 10/928,000

(22) Filed: Aug. 27, 2004

(65) Prior Publication Data

US 2005/0045066 A1    Mar. 3, 2005

(30) Foreign Application Priority Data

Sep. 3, 2003    (DE) ................. 103 40 501
Oct. 28, 2003   (DE) ................. 103 50 278

(51) Int. Cl.
    *C09C 1/24* (2006.01)
(52) U.S. Cl. ..................................... 106/456
(58) Field of Classification Search ............. 106/456, 106/712, 459; 426/632
    See application file for complete search history.

(56) References Cited

U.S. PATENT DOCUMENTS

| | | | |
|---|---|---|---|
| 1,327,061 A | | 1/1920 | Penniman et al. |
| 1,368,748 A | | 2/1921 | Penniman, Jr., et al. |
| 2,558,304 A | | 3/1948 | Marcol et al. ............... 106/304 |
| 4,137,293 A | * | 1/1979 | Nagata et al. ............... 423/140 |
| 4,225,352 A | * | 9/1980 | Makino et al. ............ 106/14.21 |
| 4,620,879 A | * | 11/1986 | Burow et al. ................ 106/432 |
| 6,042,642 A | | 3/2000 | Braun et al. ................ 106/456 |
| 6,780,555 B1 | * | 8/2004 | Uchida et al. ............ 430/106.2 |

FOREIGN PATENT DOCUMENTS

DE    24 55 158    11/1974

OTHER PUBLICATIONS

Ulmann's Encyclopedia of Industrial Chemistry, 5$^{th}$ Ed. vol. A20, p. 297ff., "Photography to Plastics, Processing" Elvers, B.
Chambaere, D. G. & De Grave, E; Phys. Chem. Minerals; 12, (1985), 176-184, "The βFeOOH to αFe$_2$O$_3$ Phase Transformation: Structural and Magnetic Phenomena".

* cited by examiner

*Primary Examiner*—David Sample
*Assistant Examiner*—Pegah Parvini
(74) *Attorney, Agent, or Firm*—Nicanor A. Kohncke

(57) ABSTRACT

The present invention relates to a process for preparing yellow iron oxide pigments by the precipitation method from iron(II) chloride or iron(II) sulphate raw material and calcium carbonate precipitant.

11 Claims, No Drawings

PROCESS FOR PREPARING YELLOW IRON OXIDE PIGMENTS WITH CACO₃ PRECIPITANT

BACKGROUND OF THE INVENTION

1. Field of the Invention

The present invention relates to a process for preparing yellow iron oxide pigments by the precipitation method from iron(II) chloride or iron(II) sulphate raw material and calcium carbonate precipitant.

2. Brief Description of the Prior Art

The precipitation method of preparing yellow iron oxide pigments has been known for a long time. The practical implementation of this method is described for example in Ullmann's Encyclopedia of Industrial Chemistry, 5$^{th}$ Ed., Vol A20, p. 297 ff. The raw material used is usually iron(II) sulphate obtained in the pickling of sheet steel or in the production of titanium dioxide by the sulphate process.

Within the pickling industry, however, an increased trend has been observed over a number of years towards the use of a hydrochloric acid pickling agent. The resultant iron(II) chloride has a purity which makes it especially suitable for preparing yellow iron oxide. Additionally the chloride process is being employed to an increasing extent worldwide for producing titanium dioxide. From both sources, therefore, there is an increased supply of solutions containing iron(II) chloride, which as far as possible should be converted to a substance of value. One common process for doing this is the spray roasting process, in which the iron(II) chloride or iron(III) chloride is subjected to oxidative hydrolysis at high temperatures (typically more than 1000° C.). End products produced here are iron oxide, typically hematite, and hydrochloric acid, which as a desired substance of value is introduced back into the pickling operation. Without further purification steps the iron oxide obtained is generally suitable for producing hard ferrites (permanent magnets).

Where readily magnetizable soft ferrites are to be produced from such iron oxides, the iron chloride solution must be subjected to additional purification operations, which make the process much more costly. Since increasing quantities of iron chloride, largely of low quality, are being made available and since the capacity of the ferrite market to absorb this supply is limited, an alternative is sought for producing a substance of value from these iron chlorides. Direct land filling or marine dumping of the iron chloride solutions is not possible, on environmental grounds.

In general α-FeOOH (yellow iron oxide) is prepared from iron(II) salts by the precipitation method, as described in DE-A 2 455 158, for example, or by the Penniman process, as described in U.S. Pat. No. 1,368,748 and U.S. Pat. No. 1,327,061. In both processes a nucleus is first prepared onto which then, in a further—relatively slow step—further α-FeOOH is caused to grow. Generally speaking, FeCl₂, unlike FeSO₄, is not isolated as a crystalline substance, since it has a much higher solubility in water as does FeSO₄. It is therefore contaminated to an extent many times greater than FeSO₄, a fact which can prove to be very disadvantageous for pigment production.

It is known that many iron(II) chloride solutions from steel pickling do not lead to pure acicular α-FeOOH nuclei when the so-called acidic nucleus process is employed; on this point see EP-A-0 406 633, Example 1, where the only product preparable was a brown powder. In many cases, instead of α-FeOOH, β-FeOOH is obtained in the form of very long, thin needles. In the course of the subsequent formation of pigment, depending on the temperature used, β-FeOOH undergoes partial breakdown into α-Fe₂O₃ (Chambaere, D. G. & De Grave, E.; Phys. Chem. Minerals; 12, (1985), 176–184). It is not possible to use β-FeOOH as nucleus material for preparing α-FeOOH pigments. In order nevertheless to be able to use the inexpensively available FeCl₂ from steel pickling for preparing α-FeOOH nucleus, it is preferred to prepare the nucleus by what is called the alkaline process, as described in U.S. Pat. No. 2,558,304, for example. Very often, however, such nuclei lead to colour values which are found to be somewhat light. On this point see, for example, EP-A 0 911 370 (L* values of from 62.0 to 64.0). For precipitation in the case of pigment synthesis it is general practice to use an alkaline precipitant. Normally NaOH, Na₂CO₃ or ammonia is used for this purpose (EP-A 911 370). Surprisingly it has been found that CaCO₃ and/or dolomite can also be used as precipitant provided that it is used in finely ground form (particle size <90 μm) as an aqueous suspension or as powder.

Industrial iron(II) chloride solutions further frequently include organic constituents (e.g. pickling assistants) and relatively large quantities of higher polyvalent cations such as Ti, Cr, Al, V and Si, for example, which can have a disruptive effect on pigment growth. The cations can be separated off by precipitation with an alkaline component. On this point see, for example, EP-A 0 911 370. The iron chloride solution resulting from such an operation has a pH of from 2 to 4.

It was an object of the present invention, therefore, to prepare by the precipitation method a yellow iron oxide pigment which has relatively dark L* values and uses preferably iron(II) chloride raw material.

SUMMARY OF THE INVENTION

The invention provides iron oxide pigments having L*, a* and b* values, measured in full shade in CIELAB units, of L*=58 to 62, preferably from 60 to 62, a*=7 to 13, preferably from 9 to 11, and b*=43 to 50, preferably from 46 to 50, a Ca content of from 10 to 6500 mg/kg iron oxide pigment, a particle length to width ratio of from 3:1 to 30:1, preferably from 5:1 to 20:1, an isoelectric point of from 6 to 9 and a water-soluble content, based on the iron oxide pigment, of from 0.01 to 2.1% by weight.

The invention further provides a process for preparing the iron oxide pigments of the invention, characterized in that:

a. an aqueous solution of an Fe(II) component having an Fe concentration of from 55 to 220 g/l, preferably from 75 to 150 g/l, based on the aqueous solution introduced, is introduced as an initial charge, b. an α-FeOOH yellow nucleus is added, c. a temperature of from 55° C. to 85° C., preferably from 60° C. to 75° C., is set, d. the oxidation is carried out to form further α-FeOOH, where 1) the temperature during oxidation is from 55° C. to 85° C., preferably from 60° C. to 75° C., and 2) the oxidation rate is from 0.2 to 10 mol % Fe(III) formed/h, preferably from 0.4 to 4.0 mol % Fe(III) formed/h;

3) during or immediately after the beginning of oxidation calcium carbonate and/or dolomite, preferably in their naturally occurring forms, are added as an aqueous suspension, as powder or as granules, as precipitant, in a concentration of from 80 to 500 g/l based on the suspension added;

4) the pH at the beginning of oxidation is raised at a rate of from 0.05 to 1.0 pH/h by continuous addition of the precipitant until the pH rise end point is reached, the pH rise end point being situated at a pH of from 2.4 to 5.2, preferably at a pH of from 2.8 to 4.2.

Pigment synthesis takes place in accordance with the following stoichiometry:

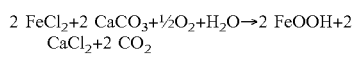
2 FeCl$_2$+2 CaCO$_3$+½O$_2$+H$_2$O→2 FeOOH+2 CaCl$_2$+2 CO$_2$ or

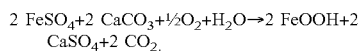
2 FeSO$_4$+2 CaCO$_3$+½O$_2$+H$_2$O→2 FeOOH+2 CaSO$_4$+2 CO$_2$.

DETAILED DESCRIPTION OF THE INVENTION

Particularly suitable for formation of pigment are stirred tanks operated batchwise, reactors with jets (liquid/gas two-fluid nozzles), loop reactors or bubble columns.

The α-FeOOH yellow nucleus is pumped into an aqueous solution of the Fe(II) component having an Fe content of from 55 to 220 g/l Fe, preferably from 75 to 150 g/l Fe, over preferably from 10 to 120 minutes. The Fe(II) component used is preferably FeCl$_2$. After the α-FeOOH yellow nucleus has been pumped in the system is heated preferably to the oxidation temperature of from 55° C. to 85° C., very preferably from 60° C. to 75° C. Then oxidation is carried out preferably at a rate of from 0.2 to 10 mol %/h of Fe(III) formed, preferably from 0.4 to 4 mol %/h. Preferably at the same time the precipitant is added at a rate such that the pH of the suspension rises by from 0.05 to 1.0 pH unit per hour. The pH is preferably raised at the stated rate until a pH of from 2.4 to 5.2, preferably from 2.8 to 4.2, is reached. When this pH has been reached the oxidation should be continued until there is no longer any free Fe(II), or virtually none.

The oxidation is preferably ended as soon as the Fe(II) content in the suspension is less than 1 mol %. Further oxidation to 100% conversion is not very rational economically, but can certainly be carried out. The oxidizing agent used is preferably atmospheric oxygen, oxygen, ozone, hydrogen peroxide, chlorine, perchlorates, sodium hypochlorite, chlorine liquor, calcium hypochlorite, chlorates(I) to (VII) or nitrates.

The precipitant used is preferably ground limestone (CaCO$_3$) or ground dolomite (CaMg(CO$_3$)$_2$ or MgCO$_3$*CaCO$_3$). The precipitant is used preferably either as an aqueous suspension having a concentration of from 80 to 500 g/l precipitant or directly as a solid. "Ground" in the sense of the invention refers to a powder having an average particle size of from 0.1 to 100 μm, the particle size having been determined by the laser diffraction method. Particular preference is given to using ground limestone where 90% of the particles have a size <45 μm. Fine powder can also be used, but in that case the concentration of CaCO$_3$ in the suspension is lower, with the consequence that more water is brought into the operation and must then be heated. Coarse particles, in the millimetre range, are less preferred, since dissolution takes longer.

Depending on reaction conditions chosen, lighter or darker yellow pigments are obtained. The following overview provides the most important control parameters;

| Parameter | "light pigments" | "darker pigments" |
|---|---|---|
| Nucleus | fine | coarse |
| Temperature | 55 to 75° C. | 60 to 85° C. |
| Final pH range | 2.4 to 3.8 | 3.2 to 5.2 |
| Oxidation | slow | rapid |

"Light pigment" for the purposes of the invention means that L* is greater than or equal to 61.

"Darker pigment" for the purposes of the invention means that L* is less than 61.

"Fine" in the sense of the invention means that the BET is more than 60 m$^2$/g.

"Coarse" in the sense of the invention means that the BET is below 60 m$^2$/g.

"Slow" in the sense of the invention means that from 0.5 to 1.0 mol % Fe(III)/h is formed.

"Rapid" in the sense of the invention means that more than 3.0 mol % Fe(III)/h is formed.

Preferred embodiment of pigment preparation:

| | |
|---|---|
| Fe(II) component: | FeCl$_2$ as aqueous solution |
| Precipitant: | CaCO$_3$, in the form for example of ground limestone from naturally occurring limestone |
| Concentration of the Fe(II) component: | 75 to 150 g/l |
| Temperature: | 60 to 75° C. |
| pH ramp: | a pH of 2.8 to 4.2 at 0.05 to 0.4 pH/h |
| Oxidation: | with atmospheric oxygen so as to form from 0.4 to 4.0 mol % Fe(III)/h. |

By appropriate variation of the stated preparation conditions the person skilled in the art will be able to prepare a wide range of yellow iron oxide pigments differing in particle size and hence in shade.

The pigment suspensions are worked up by the known steps of filtration, washing, drying and grinding.

The invention also provides a process for preparing iron oxide pigment, characterized in that the α-FeOOH yellow nucleus has a needle length of from 0.1 to 2 μm and a length to width ratio of from 30:1 to 5:1, the α-FeOOH yellow nucleus being prepared such that:

a. an alkaline precipitant such as alkali metal hydroxides, alkali metal carbonates, alkaline earth metal hydroxides, alkaline earth metal carbonates, ammonia, dolomite and combinations thereof is used in a concentration, based on the nucleus-forming reaction, of from 1.25 to 15 equivalents/l, preferably from 2.5 to 7.5 equivalents/l, b. an Fe(II) component having an Fe concentration of from 21 to 150 g/l is used, the amount of Fe(II) components being from 29% to 83% or from 125% to 500% of the stoichiometry of the alkaline precipitants, c. either the alkaline precipitant or the Fe(II) component is introduced as initial charge and heated to a temperature of from 30° C. to 60° C., preferably from 34° C. to 47° C., d. the component not introduced initially is added to the initial charge component after the temperature determined in step c) is reached, e. then oxidation is carried out, where 1) the oxidation rate is from 5 to 50 mol % Fe(III)/h, preferably from 15 to 30 mol % Fe(III)h, 2) the precipitation time is from 15 to 95 minutes, preferably from 30 to 55 minutes.

Nucleus preparation takes place in accordance with the following stoichiometry:

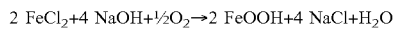

or

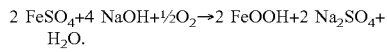

For preparing an α-FeOOH nucleus it is advantageous to use stirred tanks operated batchwise or continuously, jet reactors (without stirrers), loop reactors or tube reactors.

To a solution of an alkaline precipitant (typically sodium hydroxide, sodium carbonate, $Ca(OH)_2$ etc) is added, preferably with thorough mixing, an Fe(II) component having a concentration of from 21 to 150 g/l Fe, preferably from 44 to 132 g/l Fe, over the course of from 15 to 95 minutes, preferably from 30 to 55 minutes. When an excess of alkaline precipitant is used this procedure yields better results than the initial introduction of the Fe(II) component. Only in the case of precipitation of from 20 to 80% of the stoichiometry of iron does the initial introduction of the Fe(II) component yield better results. The range from 81 to 120% of the stoichiometry of alkaline precipitant is less preferred, since under certain conditions (in the case of high temperature and/or a low oxidation rate, for example) unwanted black magnetite may possibly form. The concentration of the alkaline precipitants is from 3 to 15 equivalents per litre (based on the stoichiometry of the nucleus-forming reaction). The amount of Fe(II) components is from 20% to 83% or from 125% to 500% of the stoichiometry of the alkaline precipitants. Precipitation takes place preferably at temperatures from 30° C. to 60° C., more preferably from 34° C. to 47° C.

In a similar way it is also possible to introduce an Fe(II) component initially and to add an alkaline precipitant.

The subsequent oxidation takes place preferably at a rate of from 5 to 50 mol % Fe(III)/h, preferably from 15 to 30 mol % Fe(III)/h. The oxidizing agent used is preferably atmospheric oxygen, oxygen, ozone, hydrogen peroxide, chlorine, perchlorates, sodium hypochlorite, chlorine liquor, calcium hypochlorite, chlorates (I) to (VII) or nitrates.

After all of the precipitated Fe(II) has been oxidized to Fe(III) (α-FeOOH), the nucleus prepared can be tested (particle size, particle morphology) and then used without further isolation for pigment preparation.

Preferred embodiment in the case of nucleus preparation is as follows:

A. Alkaline nucleus, preferred when using $FeCl_2$ as Fe(II) component:

| | |
|---|---|
| Fe(II) component: | $FeCl_2$ as an aqueous solution |
| Alkaline precipitant: | NaOH |
| Concentration of Fe(II) component: | 44 to 132 g/l Fe |
| Amount of alkaline precipitant: | 150 to 250% of the stoichiometry |
| Temperature: | 34 to 47° C. |
| Oxidation rate: | 15 to 30 mol %/h |

B. Acidic nucleus, preferred when using $FeSO_4$ as Fe(II) component:

| | |
|---|---|
| Fe(II) component: | $FeSO_4$ as an aqueous solution |
| Alkaline precipitant: | NaOH |
| Concentration of Fe(II) component: | 44 to 132 g/l Fe |
| Amount of alkaline precipitant: | 20 to 80% of the stoichiometry |
| Temperature: | 34 to 47° C. |
| Oxidation rate: | 10 to 30 mol %/h |

The invention also provides for the use of the above-prepared yellow iron oxide pigments in construction materials, for colouring plastics or paper or for preparing colorant formulations, for preparing colorants, such as those which come into contact with foods, for preparing emulsion paints or other coating materials and inks, and also for preparing heterogeneous catalysts, preferably for ethylbenzene dehydrogenation. The above-prepared yellow iron oxide pigment can also be used for preparing red iron oxide pigments.

Both in nucleus preparation and in pigment preparation the iron(II) chloride can be partly replaced by iron(II) sulphate or another inexpensive Fe(II) source. The preferred embodiment is, however, the exclusive use of iron(II) chloride.

Below the invention is described by way of example, but no restrictions whatsoever are to be seen in this exemplary description.

EXAMPLES

Description of the Measurement Methods Used

The full-shade colour and reduction colour of the particles obtained are determined as specified in EP-B-0911370, page 4 line 10 to page 6, line 9.

The crystallite size was determined by X-radiography in a Phillips powder defractometer. The crystallite size is determined by reference to the mid-peak width of the 110 reflex.

The length to width ratio of the crystals was determined by means of electron micrographs.

The BET surface is determined by the so-called 1-point method in accordance with DIN 66131. The gas mixture used is 90% He and 10% $N_2$, with measurement at −196° C. Prior to the measurement the sample is heated at 140° C. for 60 minutes.

The NaOH content was determined by means of acidimetric titration. The detection limit of the method is 0.1%.

The Ca content was determined by means of ICP. The detection limit of the method is 10 μg/kg.

The isoelectric point was determined by acidimetric titration with simultaneous measurement of the charge. The IEP is the pH at which the charge is 0. The detection limit of the method is 0.1 pH.

The water-solubles fractions were determined in accordance with DIN-ISO 787 Part 3. The detection limit of the method is 0.01%.

The α-FeOOH content was determined by gravimetry. The detection limit of the method is 0.1%.

The measurement of the pH during nucleus preparation and pigment preparation took place by measurement with a pH electrode and evaluation of the signal with a pH meter with temperature compensation. The detection limit of the method is 0.1 pH.

The substance used for comparison was the high-grade yellow iron oxide pigment Bayferrox® 920 from Bayer AG.

Example 1

Preparation of an Alkaline α-FeOOH Yellow Nucleus

An alkaline precipitant comprising 2100 mol of sodium hydroxide solution with a concentration of 100 g/l was pumped into a 1500-litre reactor with a number of injectors for gas introduction. The reactor was heated to 35° C. and then an Fe(II) component comprising 439 l of FeCl$_2$ solution=450 mol FeCl$_2$ (FeCl$_2$: 130 g/l; HCl: 22.2 g/l) was pumped in over the course of 60 minutes. After the end of precipitation oxidation was carried out for 170 minutes using 10000 l (stp)/h of air.

The alkaline α-FeOOH yellow nucleus obtained had the following properties:

| | |
|---|---|
| BET surface area [m$^2$/g]: | 61 |
| X-radiographic crystallite size [nm]: | 14 |
| α-FeOOH content [g/l]: | 32.1 |
| NaOH content [g/l]: | 32.3 |
| Length to width ratio | 12:1 |

Example 2

Preparation of an Acidic α-FeOOH Yellow Nucleus 17.2 kg of FeSO$_4$ solution having an FeSO$_4$ content of 2.25 kg FeSO$_4$=14.8 mol FeSO$_4$ are introduced as Fe(II) component into a stirred tank with a capacity of 30 litres and are heated to 30° C. After the desired temperature has been reached precipitation is carried out with 1.96 kg of NaOH solution as alkaline precipitant, with a total of 0.474 kg NaOH=11.84 mol NaOH, in 30 minutes. Subsequently oxidation is carried out with 88 l/h of air until all of the precipitated Fe(II) has been oxidized. The end of oxidation is evident from a sharp drop in the pH from 7.8 to 4. The degree of precipitation is 40% (NaOH/2/FeSO$_4$). The pH at the end of oxidation is 3.9. The oxidation time was 190 minutes. A nucleus of this kind can be used directly to prepare yellow iron oxide pigments.

The acidic α-FeOOH yellow nucleus obtained had the following properties:

| | |
|---|---|
| BET surface area [m$^2$/g]: | 65 |
| X-radiographic crystallite size [nm]: | 16 |
| α-FeOOH content [g/l]: | 31.8 |
| NaOH content [g/l]: | 0 |
| Length to width ratio | 10:1 |

Example 3

Preparation of a Yellow Iron Oxide Pigment

A 30-litre stirred tank with 3-stage cross-arm stirrer, gas introduction via a gassing ring below the stirrer, electrical jacket heating, jacket cooling, pH measurement, redox measurement and temperature measurement was charged with an Fe(II) component comprising 19 mol FeCl$_2$ in the form of an aqueous solution (Fe content: 88.1 g/l, HCl content: 34.3 g/l). Pumped into this initial charge over 30 minutes with continual stirring (rotational speed 831 l/min) were 2766 ml of the α-FeOOH yellow nucleus suspension from Example 1 (=1.0 mol FeOOH and 2.2 mol NaOH). The mixture was subsequently heated to 75° C. and oxidation was commenced with 8 l(stp)/h of air. When 75° C. had been reached a precipitant comprising a suspension of ground limestone (calcium carbonate content: 247 g/l) was pumped in slowly so that the increase in pH was 0.2 pH units/h. The end point of the pH increase was at a pH of 3.2. When this figure was reached the pumped introduction of the ground limestone suspension was regulated so that despite the continued oxidation it was possible to maintain a pH of 3.2+/−0.2 in the reaction suspension. The duration of the oxidation was 5549 minutes, giving an oxidation rate of 1.08 mol % Fe(III) formed/h. In the course of the oxidation samples were taken and were filtered, washed and dried and analysed for their colour values.

| | Full shade, L64, absolute and relative against | | | | | | Reduction, L64 relative against Bayferrox ® 920 | | |
|---|---|---|---|---|---|---|---|---|---|
| | Bayferrox ® 920 | | | | | | CS | | |
| Sample | L* | a* | b* | dL* | da* | db* | [%] | da* | db* |
| 3/A | 60.8 | 9.0 | 44.7 | 0.2 | −2.1 | −3.5 | 96 | −0.8 | 0.4 |
| 3/B | 61.0 | 9.5 | 46.1 | 0.4 | −1.6 | −2.1 | 93 | −0.6 | 0.3 |
| 3/C | 60.6 | 10.0 | 47.1 | 0.0 | −1.1 | −1.1 | 94 | −0.3 | −0.8 |
| 3/D | 60.4 | 10.3 | 47.1 | −0.2 | −0.8 | −1.1 | 94 | −0.1 | −0.9 |
| 3/final | 59.7 | 10.9 | 47.4 | −1.1 | −0.2 | −0.8 | 97 | 0.1 | −2.6 |

The pigment prepared in this way (sample 3/final) additionally had the following properties:

| | |
|---|---|
| Ca content: | 40 mg/kg |
| Length to width ratio: | 10:1 |
| Isoelectric point: | 7.8 |
| Water-solubles content: | 0.08% by weight |

Example 4

Preparation of a Yellow Iron Oxide Pigment

The apparatus described in Example 2 was charged with an Fe(II) component comprising 19 mol FeCl$_2$ in the form of an aqueous solution (Fe content: 88.1 g/l, HCl content: 5.0 g/l). Pumped into this initial charge over 30 minutes with continual stirring (rotational speed 831 l/min) were 3193 ml of an α-FeOOH yellow nucleus suspension (=1.37 mol FeOOH and 1.7 mol NaOH). The mixture was subsequently heated to 75° C. and oxidation was commenced with 19 l(stp)/h of air. When 75° C. had been reached a precipitant comprising a suspension of ground dolomite (carbonate content: 2.85 mol/l) was pumped in slowly so that the increase in pH was 0.2 pH units/h. The end point of the pH increase was at a pH of 3.4. When this figure was reached the pumped introduction of the ground dolomite suspension was regulated so that despite the continued oxidation it was possible to maintain a pH of 3.4+/−0.2 in the reaction suspension. The duration of the oxidation was 2068 minutes, giving an oxidation rate of 2.9 mol % Fe(III) formed/h. In the course of the oxidation samples were taken and were filtered, washed and dried and analysed for their colour values.

| | Full shade, L64, absolute and relative against Bayferrox ® 920 | | | | | | Reduction, L64 relative against Bayferrox ® 920 | | |
|---|---|---|---|---|---|---|---|---|---|
| Sample | L* | a* | b* | dL* | da* | db* | CS [%] | da* | db* |
| 4/A | 61.6 | 9.9 | 46.4 | 0.7 | −1.2 | −2.4 | 98 | −0.5 | −1.2 |
| 4/B | 60.9 | 10.2 | 46.2 | −0.1 | −0.9 | −2.6 | 100 | −0.3 | −2.4 |
| 4/final | 60.0 | 10.1 | 45.6 | −0.9 | −1.0 | −3.2 | 105 | −0.5 | −3.5 |

The pigment prepared in this way (sample 4/final) additionally had the following properties:

| | |
|---|---|
| Ca content: | 50 mg/kg |
| Length to width ratio: | 8:1 |
| Isoelectric point: | 7.2 |
| Water-solubles content: | 0.11% by weight |

Example 5

Preparation of a Yellow Iron Oxide Pigment

An apparatus as described in Example 2 was charged with an Fe(II) component comprising 11/64 l of aqueous $FeSO_4$ solution (Fe content: 84.1 g/l). With continual stirring (rotational speed 831 l/min) 2906 ml of α-FeOOH yellow nucleus suspension containing 30.6 g/l FeOOH (prepared by the acidic nucleus process with a degree of precipitation of 40.5% based on Fe) and having an Fe(II) content of 28.3 g/l were added to this initial charge, so that a total of 19 mol of Fe(II) were available for the pigment synthesis. The mixture was subsequently heated to 70° C. and oxidation was commenced with 19 l(stp)/h of air. When 70° C. had been reached a precipitant comprising a suspension of ground limestone (calcium carbonate content: 375 g/l) was pumped in so that the increase in pH was 0.2 pH units/h. The end point of the pH increase was at a pH of 4.2. When this figure was reached the pumped introduction of the ground limestone suspension was regulated so that despite the continued oxidation it was possible to maintain a pH of 4.2+/−0.2 in the reaction suspension. The duration of the oxidation was 2725 minutes, giving an oxidation rate of 2.2 mol % Fe(III) formed/h. During the oxidation samples were taken and worked up. The working-up includes the separation of the gypsum formed in the reaction. This can be done, for example, by washing, sedimentation or any other technical methods suitable for solids/solids separation. The colour values of the dried samples were determined.

| | Full shade, L64, absolute and relative against Bayferrox ® 920 | | | | | | Reduction, L64 relative against Bayferrox ® 920 | | |
|---|---|---|---|---|---|---|---|---|---|
| Sample | L* | a* | b* | dL* | da* | db* | CS [%] | da* | db* |
| 5/A | 61.6 | 8.0 | 44.1 | 0.7 | −3.1 | −4.5 | 90 | −1.2 | 2.1 |
| 5/B | 61.8 | 8.4 | 45.3 | 0.9 | −2.7 | −3.2 | 91 | −1.2 | 1.8 |
| 5/C | 61.8 | 8.8 | 46.6 | 0.9 | −2.3 | −2.0 | 93 | −1.1 | 1.3 |
| 5/D | 61.8 | 9.2 | 47.3 | 0.9 | −1.8 | −1.3 | 94 | −0.9 | 1.3 |
| 5/final | 61.9 | 9.2 | 47.2 | 1.0 | −1.8 | −1.4 | 94 | −0.8 | 1.4 |

The pigment prepared in this way (sample 5/final) additionally had the following properties:

| | |
|---|---|
| Ca content: | 30 mg/kg |
| Length to width ratio: | 5:1 |
| Isoelectric point: | 8.4 |
| Water-solubles content: | 0.04% by weight |

Example 6

Preparation of a Yellow Iron Oxide Pigment

An apparatus as described in Example 2 was charged with an Fe(I) component comprising 11/64 l of aqueous $FeSO_4$ solution (Fe content: 84.1 g/l). With continual stirring (rotational speed 831 l/min) 2906 ml of α-FeOOH yellow nucleus suspension containing 30.6 g/l FeOOH (prepared by the acidic nucleus process with a degree of precipitation of 40.5% based on Fe) and having an Fe(II) content of 28.3 g/l were added to this initial charge, so that a total of 19 mol of Fe(II) were available for the pigment synthesis. The mixture was subsequently heated to 75° C. and oxidation was commenced with 19 l(stp)/h of air. When 75° C. had been reached a precipitant comprising a suspension of ground limestone (calcium carbonate content: 375 g/l) was pumped in so that the increase in pH was 0.2 pH units/h. The end point of the pH increase was at a pH of 3.7. When this figure was reached the pumped introduction of the ground limestone suspension was regulated so that despite the continued oxidation it was possible to maintain a pH of 3.7+/−0.2 in the reaction suspension. The duration of the oxidation was 4088 minutes, giving an oxidation rate of 1.5 mol % Fe(III) formed/h. During the oxidation samples were taken and worked-up and the colour values of the dried samples were determined.

| | Full shade, L64, absolute and relative against Bayferrox ® 920 | | | | | | Reduction, L64 relative against Bayferrox ® 920 | | |
|---|---|---|---|---|---|---|---|---|---|
| Sample | L* | a* | b* | dL* | da* | db* | CS [%] | da* | db* |
| 6/A | 62.0 | 8.7 | 45.9 | 1.2 | −2.5 | −2.6 | 90 | −1.0 | 2.6 |
| 6/B | 61.7 | 9.5 | 47.0 | 0.8 | −1.6 | −1.5 | 93 | −0.7 | 2.0 |
| 6/C | 61.6 | 9.9 | 47.3 | 0.7 | −1.2 | −1.2 | 96 | −0.5 | 1.5 |
| 6/D | 61.1 | 10.6 | 47.7 | 0.3 | −0.6 | −0.9 | 103 | −0.3 | 0.5 |
| 6/E | 60.6 | 10.9 | 47.5 | −0.2 | −0.2 | −1.0 | 104 | −0.1 | 0.2 |
| 6/F | 60.7 | 11.1 | 47.7 | −0.2 | −0.1 | −0.9 | 103 | −0.0 | 0.3 |
| 6/final | 60.8 | 11.0 | 47.7 | 0.0 | −0.2 | −0.9 | 104 | −0.1 | 0.6 |

The pigment prepared in this way (sample 6/final) additionally had the following properties:

| | |
|---|---|
| Ca content: | 6200 mg/kg |
| Length to width ratio: | 4:1 |
| Isoelectric point: | 7.7 |
| Water-solubles content: | 2.05% by weight |

What is claimed is:

1. Iron oxide pigment having L*, a* and b* values, measured in full shade in CIELAB units, of
   L*=58 to 62,
   a*=7 to 13, and
   b*=43 to 50,
   a Ca content of from 10 to 6500 mg/kg iron oxide pigment, a particle length to width ratio of from 3:1 to 30:1, an isoelectric point of from 6 to 9 and a water-solubles content, based on the iron oxide pigment, of from 0.01 to 2.1% by weight.

2. Process for preparing iron oxide pigments according to claim 1, comprising introducing as an initial charge an aqueous solution of an Fe(II) component, adding an α-FeOOH yellow nucleus, then carrying out oxidation and at the same time as or immediately after the beginning of oxidation and adding calcium carbonate, as an aqueous suspension, as powder or as granules as precipitant.

3. Process for preparing iron oxide pigments according to claim 1, comprising:
   a. introducing as an initial charge an aqueous solution of an Fe(II) component having an Fe concentration of from 55 to 220 g/l, based on the aqueous solution introduced,
   b. adding an α-FeOOH yellow nucleus,
   c. setting a temperature of from 55° C. to 85° C.,
   d. carrying out the oxidation to form further α-FeOOH, where
      1) the temperature during oxidation is from 55° C. to 85° C., and
      2) the oxidation rate is from 0.2 to 10 mol % Fe(III) formed/h;
      3) during or immediately after the beginning of oxidation calcium carbonate and/or dolomite, are added as an aqueous suspension, as powder or as granules, as precipitant, in a concentration of from 80 to 500 g/l based on the suspension added;
      4) the pH at the beginning of oxidation is raised at a rate of from 0.05 to 1.0 pH/h by continuous addition of the precipitant until the pH rise end point is reached, the pH rise end point being situated at a pH of from 2.4 to 5.2.

4. Process for preparing iron oxide pigment according to claim 2, characterized in that the α-FeOOH yellow nucleus has a needle length of from 0.1 to 2 μm and a length to width ratio of from 30:1 to 5:1, the α-FeOOH yellow nucleus being prepared such that either an alkaline precipitant selected from the group consisting of alkali metal hydroxides, alkali metal carbonates, alkaline earth metal hydroxides, alkaline earth metal carbonates, ammonia, dolomite and combinations thereof is used or an Fe(II) component is introduced as an initial charge and heated, the component not introduced initially being added to the initial charge component, and then oxidation is carried out.

5. Process for preparing iron oxide pigment according to claim 2, characterized in that the α-FeOOH yellow nucleus has a needle length of from 0.1 to 2 μm and a length to width ratio of from 30:1 to 5:1, the α-FeOOH yellow nucleus being prepared such that:
   a. an alkaline precipitant such as alkali metal hydroxides, alkali metal carbonates, alkaline earth metal hydroxides, alkaline earth metal carbonates, ammonia, dolomite and combinations thereof is used in a concentration, based on the nucleus-forming reaction, of from 1.25 to 15 equivalents/l,
   b. an Fe(II) component having an Fe concentration of from 21 to 150 g/l is used, the amount of Fe(II) components being from 20% to 83% or from 125% to 500% of the stoichiometry of the alkaline precipitant,
   c. either the alkaline precipitant or the Fe(II) component is introduced as initial charge and heated to a temperature of from 30° C. to 60° C.,
   d. the component not introduced initially is added to the initial charge component after the temperature determined in step c) is reached,
   e. then oxidation is carried out, where
      1) the oxidation rate is from 5 to 50 mol % Fe(III)/h,
      2) the precipitation time is from 15 to 95 minutes.

6. Process for preparing yellow iron oxide pigments according to claim 2, characterized in that atmospheric oxygen, oxygen, ozone, hydrogen peroxide, chlorine, chlorates (I) to (VII) or nitrates are used as oxidizing agents.

7. A process for colouring building materials comprising providing yellow iron oxide pigment according to claim 1.

8. A process for colouring plastics or paper or for preparing colorant preparations comprising providing yellow iron oxide pigment according to claim 1.

9. A process for preparing colorants which come into contact with foods comprising providing yellow iron oxide pigment according to claim 1.

10. A process for preparing heterogeneous catalysts comprising providing yellow iron oxide pigment according to claim 1.

11. A process for preparing red iron oxide pigments comprising providing yellow iron oxide pigment according to claim 1.

* * * * *